US008631486B1

(12) United States Patent
Friedman et al.

(10) Patent No.: US 8,631,486 B1
(45) Date of Patent: Jan. 14, 2014

(54) ADAPTIVE IDENTITY CLASSIFICATION

(75) Inventors: Lawrence N. Friedman, Arlington, MA (US); Riaz Zolfonoon, Marlborough, MA (US); William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 478 days.

(21) Appl. No.: 12/414,845

(22) Filed: Mar. 31, 2009

(51) Int. Cl.
*G06F 21/00* (2013.01)

(52) U.S. Cl.
USPC .................................. 726/19; 726/4; 726/21

(58) Field of Classification Search
USPC ......................................................... 726/21
See application file for complete search history.

(56) References Cited

U.S. PATENT DOCUMENTS

| 5,602,933 | A  | * | 2/1997 | Blackwell et al. | ............ 382/116 |
| 2003/0101348 | A1 | * | 5/2003 | Russo et al. | .................. 713/185 |
| 2008/0091681 | A1 | * | 4/2008 | Dwivedi et al. | .................... 707/9 |
| 2009/0006230 | A1 | * | 1/2009 | Lyda et al. | ...................... 705/35 |

* cited by examiner

*Primary Examiner* — Philip Chea
*Assistant Examiner* — Kendall Dolly
(74) *Attorney, Agent, or Firm* — Krishnendu Gupta; Joseph D'Angelo

(57) ABSTRACT

A method is used in identity assurance. A process is executed that is used to verify a user identity. A description of the executed process is stored and is used to determine a level of trust.

19 Claims, 17 Drawing Sheets

ADAPTIVE IDENTITY CLASSIFICATION

TECHNICAL FIELD

This invention relates to identity assurance.

BACKGROUND OF THE INVENTION

Many computer users and other entities have systems that utilize some form of security. Therefore, there often arises a need to prevent all but selected authorized persons from being able to carry out some defined transaction (such as granting of credit) or to gain access to electronic equipment or other system, facility or data. Preventing unauthorized clearance or access typically involves devices which limit access to the subject data, facility, or transaction to those who possess a unique physical device, such as a key or who know a fixed or predictable (hereinafter "fixed") secret code. In at least some cases, relying on a fixed code or unique physical device as the means to control such selective clearance or access can mean that would-be unauthorized users need only obtain possession of the fixed code or unique device to gain such clearance or access. Typical instances of fixed codes include card numbers, user numbers or passwords issued to customers of computer data retrieval services.

SUMMARY OF THE INVENTION

A method for use in identity assurance. A process is executed that is used to verify a user identity. A description of the executed process is stored and is used to determine a level of trust.

DETAILED DESCRIPTION

Figure 1:
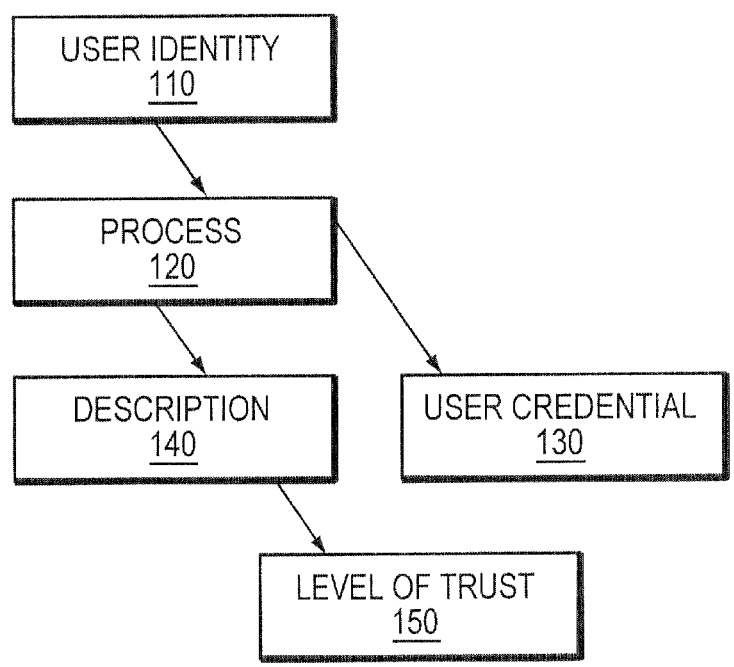
FIGS. 1, 5, 7, 9, 11, 13, and 16-17 show implementations of embodiments of an apparatus for use in assuring identity.

Traditional identity management systems are capable of account creation and credential issuance. However, at least some existing systems (such as PKI and Certificate Issuance policies) can be difficult to implement. As a result, in many cases current approaches are not being used.

However, in accordance with the technique described herein, identity classification provides a measurable level of assurance that an identity is authentic. The level of assurance can be used to help satisfy compliance requirements. Identity classification transcends at least some infrastructural constraints of existing systems and allows for a broader range of systems to participate in the management and enforcement of identity classification policy.

Conventionally, in today's identity management and provisioning systems, identity proofing is the process of establishing confidence in a user's digital identity used within an information system. Traditionally, the identity proofing process can take place electronically or in person when the user applies to a registration authority in order to create an account and obtain an electronic credential that will allow the user to access resources and perform transactions at a service provider. Conventionally, the result of the registration binds, through a simple name, the user to the created account, credential, and other verified attributes about the user.

By contrast, according to at least one implementation of the technique described herein, maintaining the data used to verify the authenticity of the user by the registration authority during account/credential creation can be used to classify identities. Registration data such as the registration method—where the registration took place (e.g., online or in-person), verified documents—in-person (e.g., passport or driver's license), online (e.g., knowledge based questions, or device identifier), registration location (e.g. IP Address) or registration expiration provide a basis for a classification.

For example in accordance with at least one implementation of the technique, a user that registers online and provides no verifiable documents would fall into an "untrusted" classification (high risk of fraud). Conversely, a user that registers online with a proof of identity from a trusted source (e.g., a digital certificate, or successful completion of a knowledge based authentication) would fall into a "verified-online" classification (low risk of fraud). A user that is registered by the registrar without accompanying paper documentation would fall into an "unverified" classification (medium risk of fraud). A user that registers in-person and provides two forms of paper documentation that are verified by the registrar would fall into the "verified-in person" classification (low risk of fraud).

Identity classifications can then be used as additional factors in policy statements to allow authentication and authorization systems to enforce behavior. Authentication policy can force an additional authentication method challenge for high-risk identity classification. Authorization systems can allow or disallow access to resources based on identity classifications. Data protection systems can also use identity classification as part of the data protection policy. System event monitors can also use identity classification to trace events through the system or to alert administrators.

For at least some implementations, the following terminology can be useful in describing the identify classification in a provisioning process. Issuance can be when the user is given the initial credential. Replacement can be when an attribute of the user or authenticator changes. Emergency authentication can be when a user does not have access to the credential. Elevated authentication can be when access to sensitive data requires an additional level of authentication. Termination can be when credentials are revoked. Identity Classification can indicate the strength of the identity proofing mechanism when registering a user. Authentication Strength can indicate the strength of the method by which a user can prove he is the claimed registered user. Identity assurance can depend on both the strength of the classification and the authentication strength.

Figure 2:
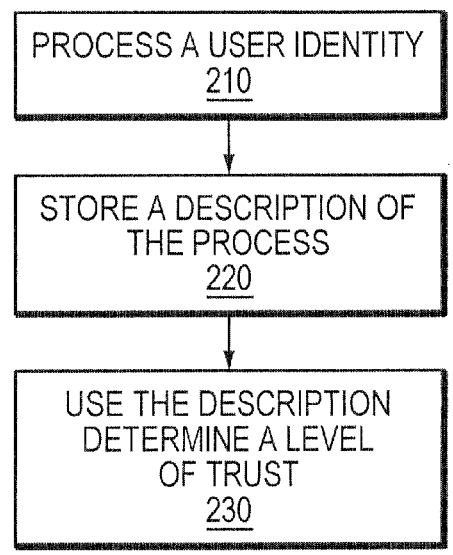
FIGS. 2-4, 6, 8, 10, 12, 14, and 15 show implementations of embodiments of a method for assuring identity.
Figure 3:
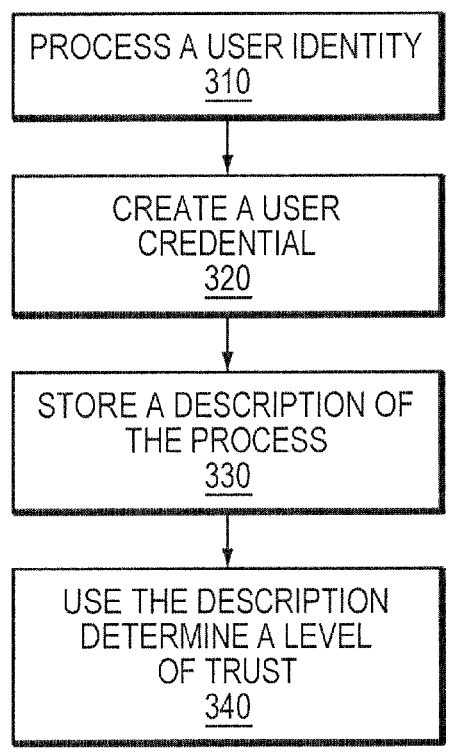

FIGS. 1 and 2 show a first implementation in accordance with the technique. As shown, a user identity 110 may be processed by a process 120 (step 210). A description 140 of the processing 210 may be stored (step 220). In some embodiments, the description may be stored in a central depository or other location to prevent the user from gaining access to the description. In other embodiments, the description may be stored proximate to the credential. In even other embodiments, a reference of the description may be stored with or in the user credential, and the description itself stored in a secure or central location. The description 140 may be used to determine a level of trust 150 (step 230). As well, in a second implementation of FIG. 3, when the user identity 110 is processed in process 120 (step 310), a user credential 130 may also be created (step 320).

Figure 4:
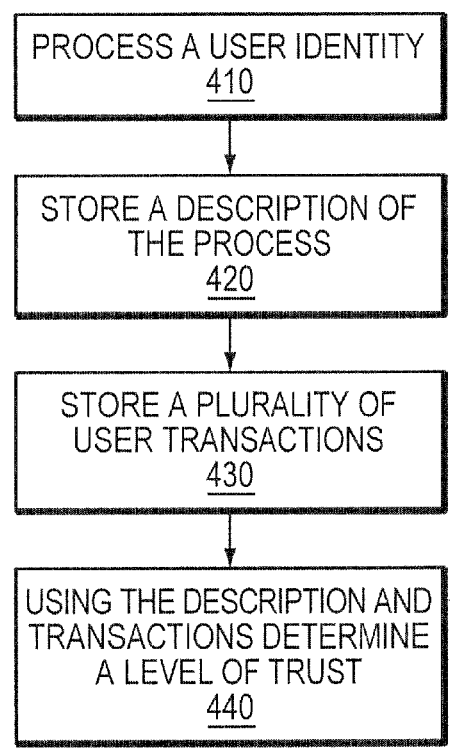
Figure 5:
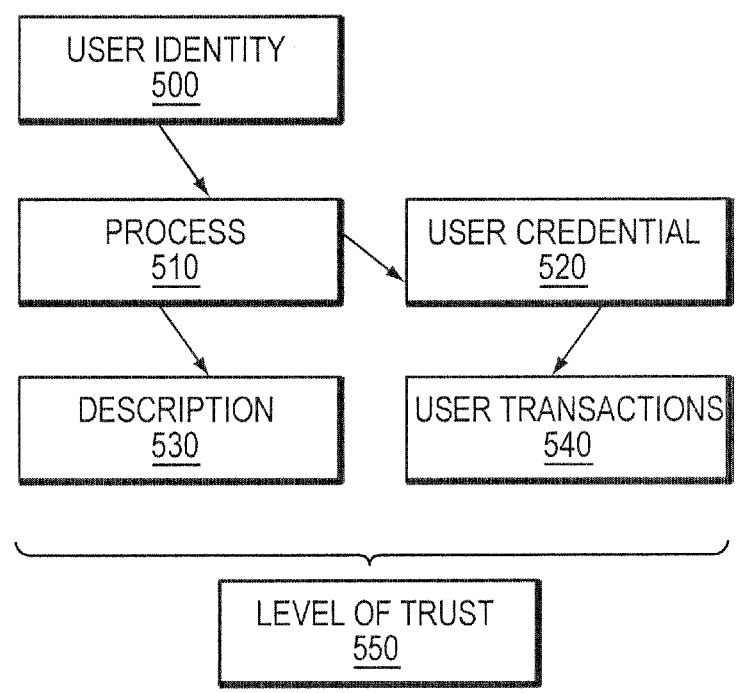

Referring now to FIGS. 4 and 5, a third implementation of the technique is illustrated. In this implementation, user transactions 540 may be stored (step 430). The user transactions 540 and description 530 may be used to determine a level of trust 550 (step 440).

Figure 6:
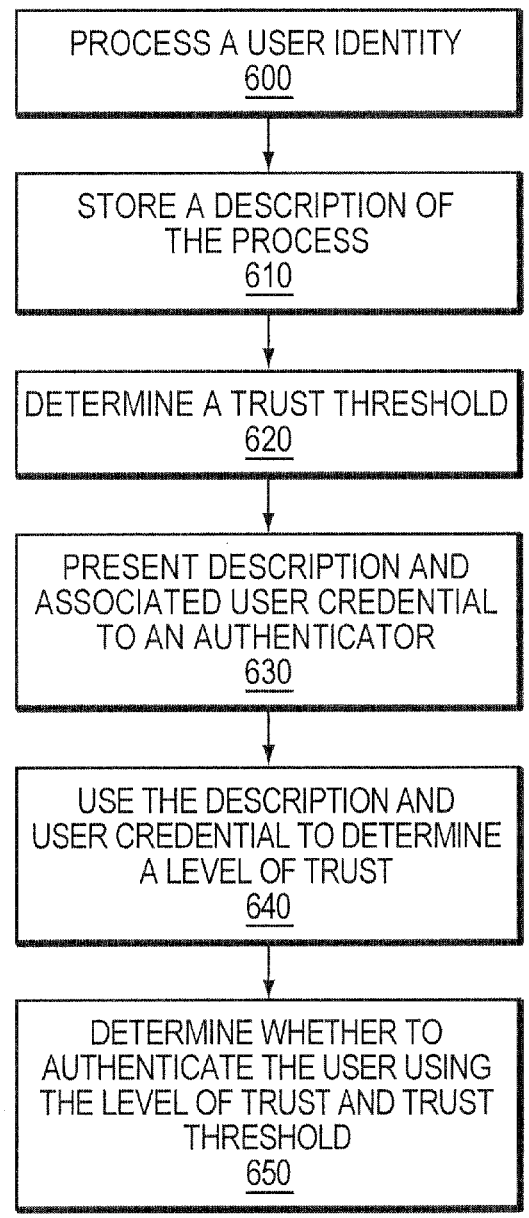
Figure 7:
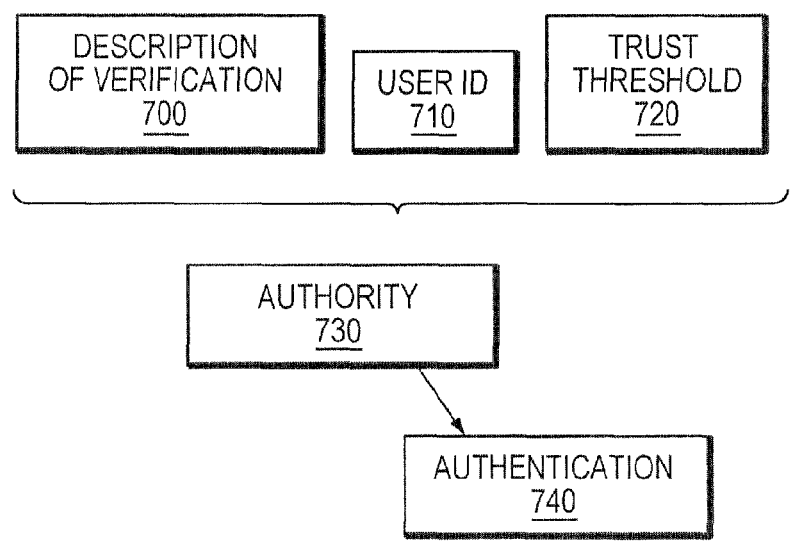

FIGS. 6 and 7 describe a fourth implementation of the technique. A user ID 710 may be processed (step 600) and a description 700 may be stored (step 610). A trust threshold 720 may be determined (step 640). The description 700 and user ID 710 are presented to an authority 730 (step 630). Authentication 740 may be determined based on the level of trust 150 and the trust threshold 720 (step 650).

Figure 8:
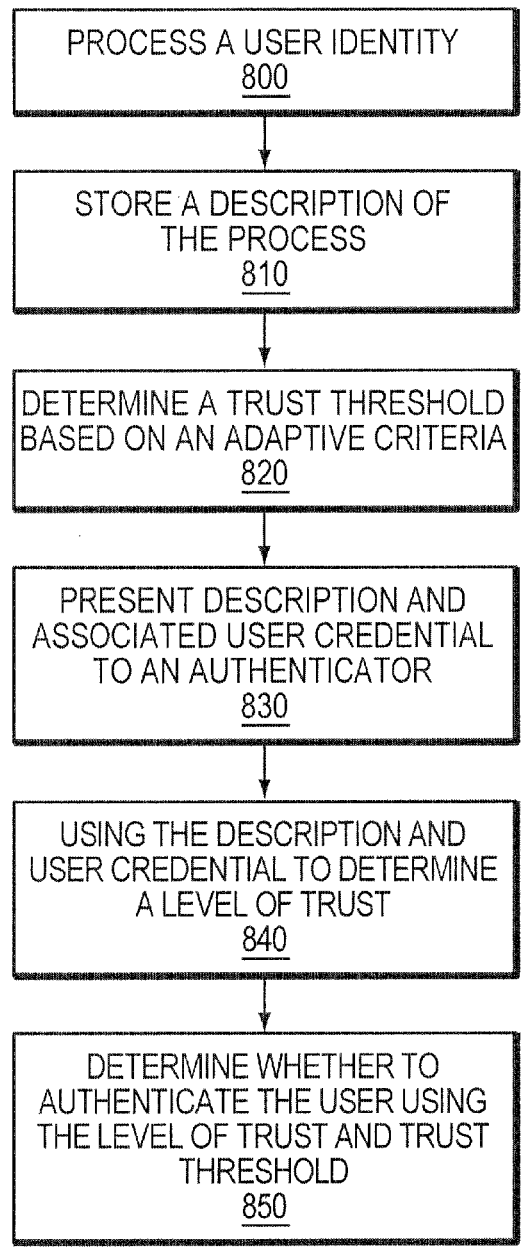
Figure 9:
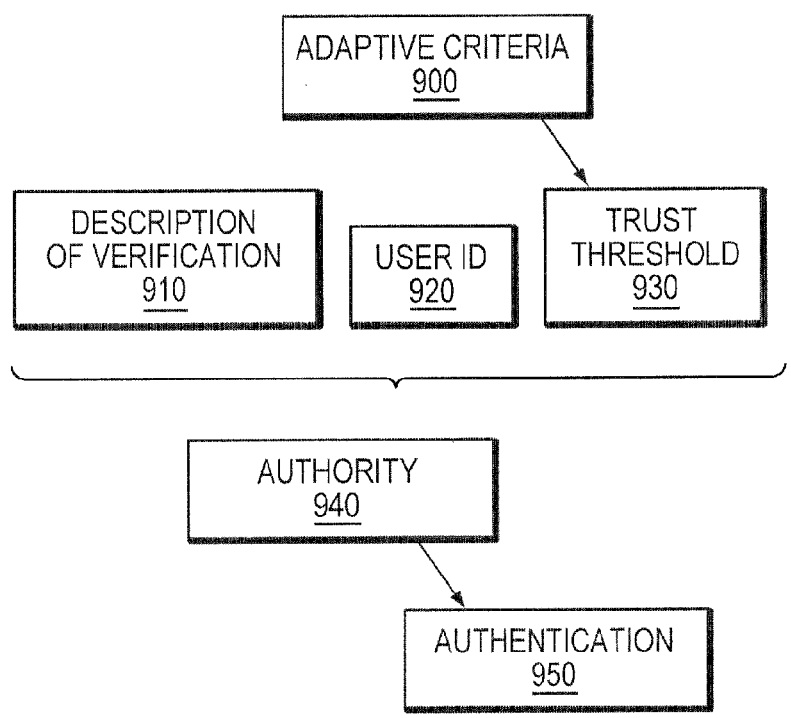

FIGS. 8 and 9 describe a fifth implementation of the technique. A user ID 920 may be processed (step 800) and a description 910 may be stored (step 810). A trust threshold 930 may be determined based on an adaptive criteria 900 (step 820). The description 910 and user ID 920 may be presented to an authority 940 (step 830). The description 910 and user ID 920 may be used to determine a level of trust (step 840). Using the level of trust and the trust threshold, it may be determined whether to authenticate the user (step 850).

Figure 10:
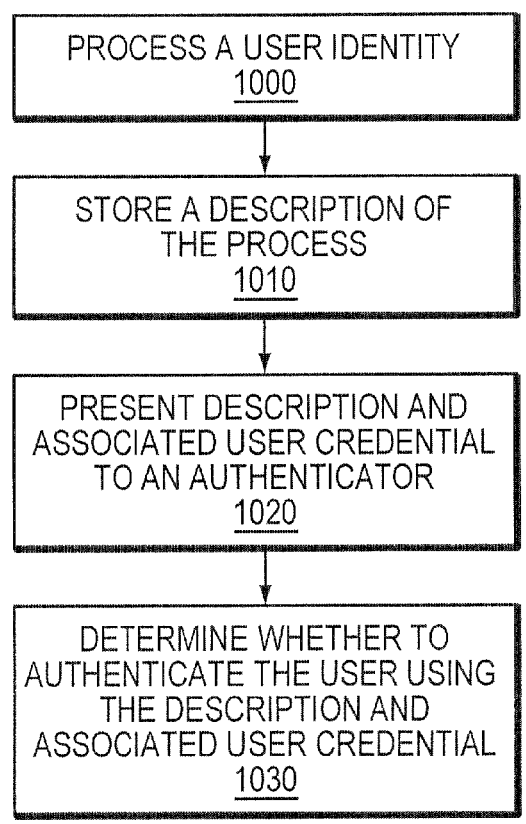
Figure 11:
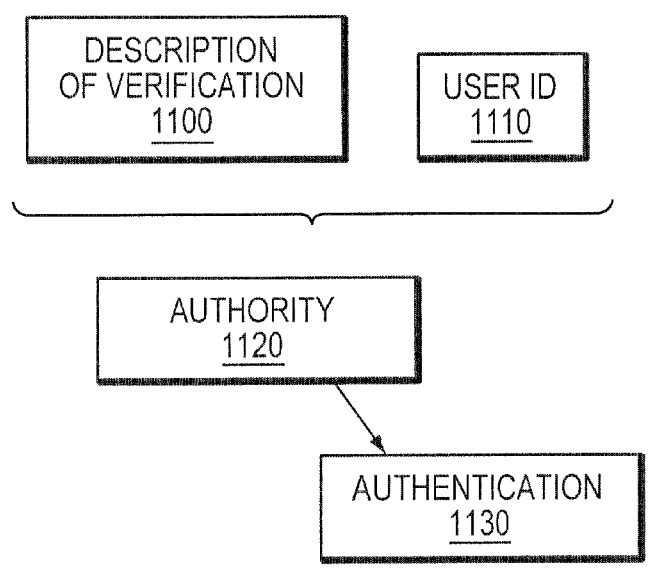

FIGS. 10 and 11 describe a sixth implementation of the technique. A user ID 1110 may be processed (step 1000) and a description 1100 may be stored (step 1010). The description 1100 and user ID 1110 may be presented to an authority 1120 (step 1020). The description 1100 and user ID 1110 may be used to decide whether to authenticate the user (step 1320).

Figure 12:
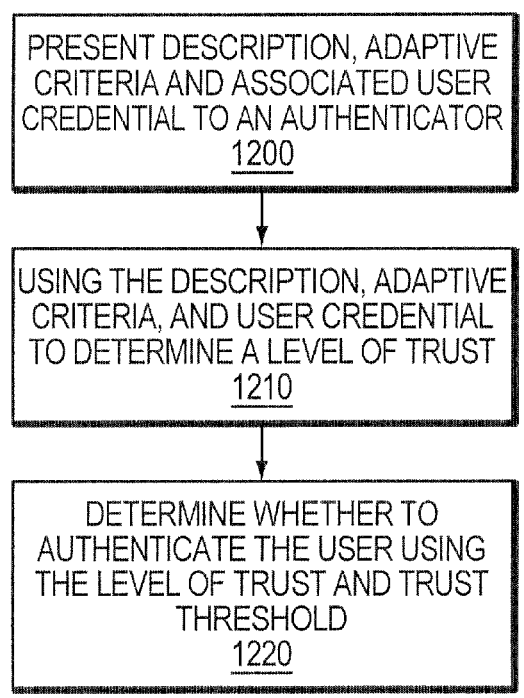
Figure 13:
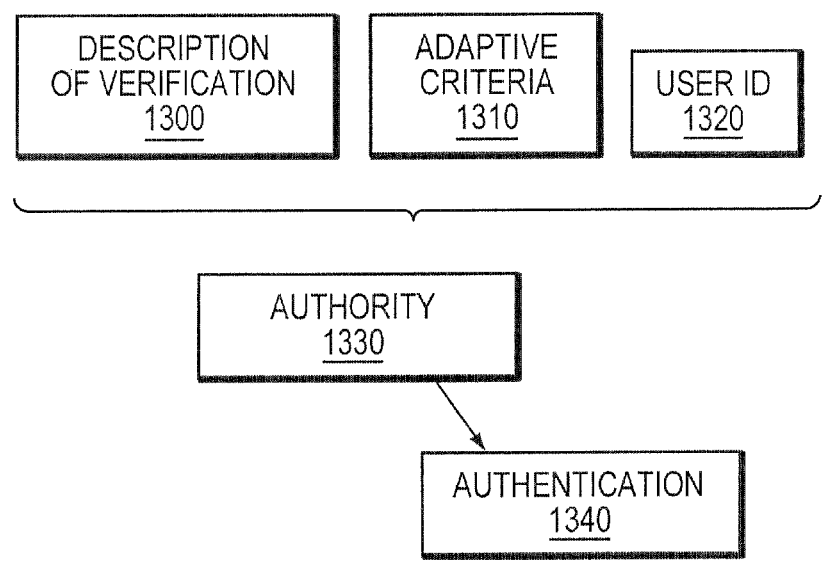

FIGS. 12 and 13 describe a seventh implementation of the technique. A user ID 1320, a description 1300, and an adaptive criteria 1310 may be presented to an authority 1330 (step 1200). The description 1300, user ID 1320, and adaptive criteria 1310 may be used to determine a level of trust (step 1210). It may be determined whether to authenticate the user using the level of trust and the trust threshold (step 1220).

Figure 14:
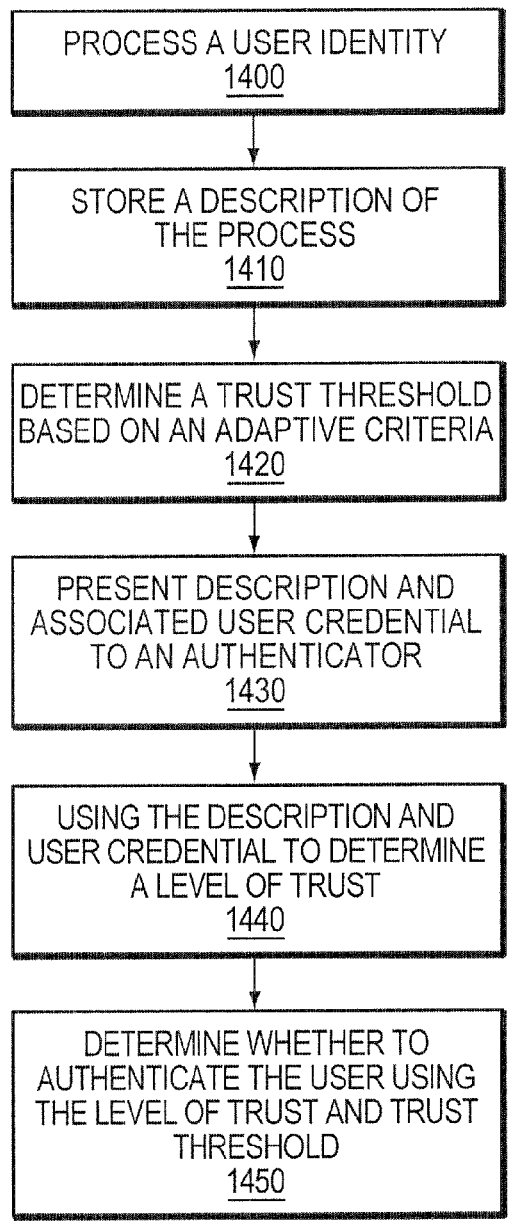
Figure 15:
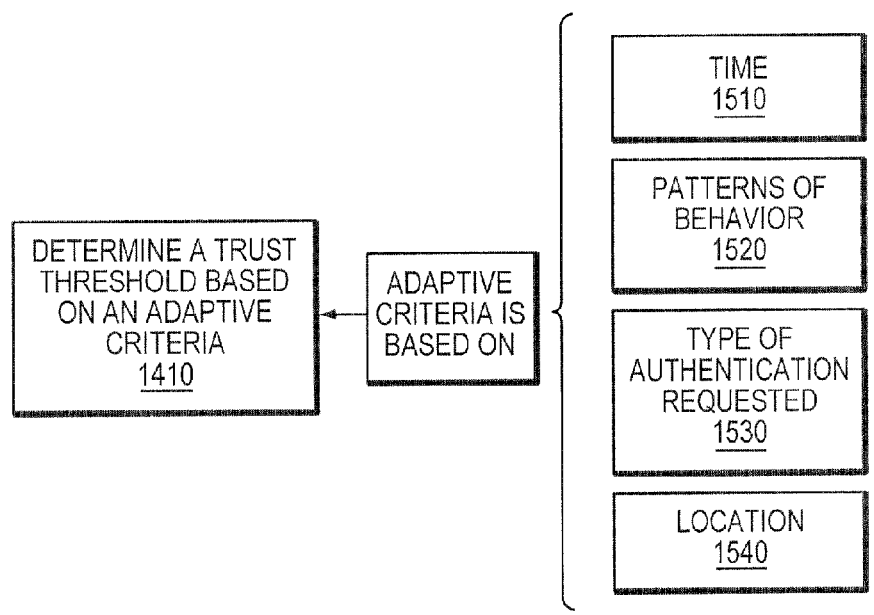
Figure 16:
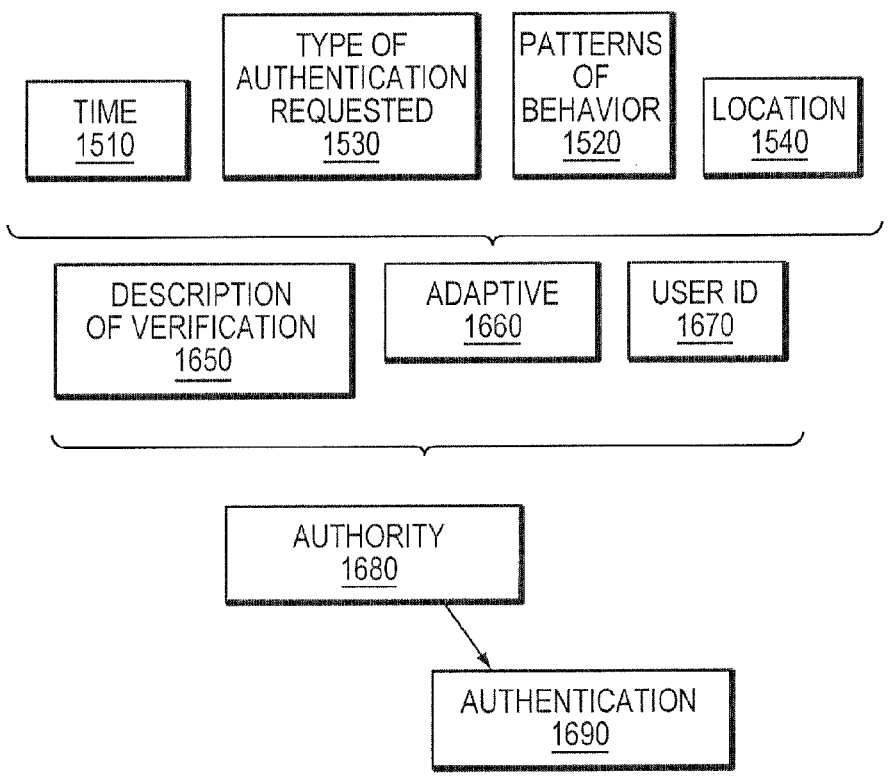

FIGS. 14, 15 and 16 describe an eighth implementation of the technique. A user ID 1670 may be processed (step 1400) and a description 1650 may be stored (step 1410). A trust threshold 930 may be determined based on an adaptive criteria 1650 (step 1420). The adaptive criteria may be based on the time 1510 of the request, patterns of behavior 1520, type of authentication requested 1530, and the location 1540 of the request. The description 1650 and user ID 1670 may be presented to an authority 1680 (step 1430). The description 1650 and user ID 1670 may be used to determine a level of trust (step 1440). Using the level of trust and the trust threshold, it may be determined whether to authenticate the user (step 1450).

For example, a particular implementation of the technique is now described with reference again to FIGS. 1 and 2. Using process 120, a user may register at a self service provisioning console ("console"), referred to herein as case 1. With respect to case 1, the user may self register by using the console with no extra proofing, which is an example of processing a user identity 210. With this respect, there is an online delivery method and the attestation or verification scheme, process 210, is the person registering stating that he or she, user identity 110, is who they say they are; which results in issuing of a user credential, such as a user credential 130. A description 140 of this process may be stored (step 220). The description 140 of the process 120 may be used to determine that a self registration results in an untrusted level, level of trust 150 (step 230). If that user presents his credentials, user credential 150, to an authenticator, with the associated description 140, that person may only be verified if an untrusted level was sufficient for verification. As well, the user need not present the associated description 140 itself. In an alternative embodiment, the user may present a reference to the description, and the authenticator may use that reference to access the description. If the verification level was higher than untrusted, then verification of that user may not be allowed. As well, the process 120 used to determine that a self registration results in an untrusted level (step 230) may occur at any time prior to or contemporaneously with verification.

Alternatively, take for example if a user were to call a support desk and seek to be registered, referred to herein as case 2. The help desk agent may invoke an RSA Identity Verification console, an example of process 120, and may verify the user's identity using Knowledge Based Authentication (KBA) questions. RSA Identity Verification is a strong authentication security solution that can assure user identities in real-time and can helps prevent the risk of identity theft and fraud. Utilizing knowledge-based authentication (KBA), RSA Identity Verification may present a user with a series of top of mind questions utilizing relevant facts on the individual obtained by scanning dozens of public record databases. RSA Identity Verification can deliver a confirmation of identity within seconds, without requiring a prior relationship with the user; a type of RSA Identity Verification is referred to herein as Verid.

The help desk agent may register the user, resulting in a user credential, such as user credential 130. The delivery method of this type would be phone and the attestation scheme would be Authority-Verid and have a fact based proof type; a description of this method may be recorded, for example, as description 140. An effective trust level may be be "VerifiedPhone." This classification may be stored in a user profile. If that user logs into an enterprise portal site and attempts to access a resource with access policy of "Allow if classification>"Un-trusted," access would be allowed.

Referring back to the classification scheme of the user who registered at the self service center in case 1, suppose this user now wishes to promote or strengthen his classification or trust level. This case will be referred to herein as case 3. The user may call the help desk and perform use case performed in case 2; verifying his identity through an RSA Identity Verification console, available from RSA, The Security Division of EMC, 174 Middlesex Turnpike Bedford, Mass. 01730. The system may add the following classification information to the user's existing data: that the Classification attributes Delivery Method now equals Phone and the attestation scheme equals Authority-Verid. This results in a fact based proof and the effective trust level is now "VerifiedPhone." However, the system may also remember that his current trust level was previously "Un-trusted." This previous information may also remain in the verification or classification description for that user. As well, the new classification may be stored in a user profile and the privacy and integrity may be protected and bound to user. If the user logs into the enterprise portal site and attempts to access a resource with access policy: "Allow if classification>"Un-trusted," access would be allowed.

Conversely, refer again to the user from case 1, where he still has an untrusted level of verification. Also take that the classified user from use case 1 exhibits "good" behavior for a period of time, referred to herein as case 4. The system may add the following classification information to user's existing data: Classification attributes:

Delivery Method=On-line,

Attestation Scheme=Risk Engine,

Proof Type=Behavior pattern, and the User's effective trust level may be increased according to administrator settings. This may result in an increase in the Risk-based Trust Increment. This classification, Effective Trust Level="VerifiedWeb" (Un-trusted→Unverified→VerifiedWeb), may be stored in a user profile and may be privacy and integrity protected and bound to the user. The user logs into the enterprise portal site and attempts to access a resource with access policy: "Allow if classification>"Un-trusted" and access is allowed.

There can be numerous ways to adapt a classification based on user behavior. For example, automatic risk-based adaptiveness can be modeled after natural trust; that is "you develop trust as you get to know a stranger." One may build reputation through a number of successful transactions or lose trust through a number of failed transactions. As well, trust may be gained or lost by the number of affiliations with other trusted entities. This "Natural Trust" mapped into the digital world relies on similar patterns of good or bad behavior. For example, successful transactions patterns of bad behaviors can be determined through analysis of activity logs and fraud networks. As well, environmental factors: e.g. time, geo-location Black/White lists, Velocity, Client location, can be helpful in modifying trust.

The aforementioned examples showed two exemplary delivery methods such as online and on the phone, although Applicants contemplate many others such as in-person verification. The attestation schemes outlined in these examples were that of a claimant, a risk engine, and an authority although many more are possible. As well, the authority may be any number of types such as a black list, Verid, or enterprise verification. Proof types might be a fact based proof, a behavior based proof, a biometric proof, as well as any other proof type. The level of classification may be any type and in one implementation may include hostile, untrusted, unverified, web verified, phone verified, and verified in person.

In an alternative implementation, the classification data may be classified or encrypted. The classification or encryption may be used to prevent disclosure of the classification data. As well, the encryption may be used as a measure to prevent tampering with the classification data. In an implementation, the classification data may be protected by a unique, symmetric, cryptographic key. In a further implementation, encrypted classification data may be able to be recovered in case of a disaster or data loss.

In a particular implementation of the encryption of the classification, a set of keys may be used. A key recovery key (Kr) may be a RSA public Key used to recover encrypted classification data. A system key (Ks) may be a strong symmetric key generated at system install time which may be used to protect Classification data system secrets. As well a classification data key (Kc) is an internally generated strong symmetric key may be used by the system to protect the classification data. This key may be generated for each subject's classification data.

In an alternative implementation, classification data may be encrypted using a symmetric key (Kc); where encrypted data E1=(Classification Data) Kc. Kc may be encrypted using a key available to the system for encryption Ks; where encrypted data E2=(Kc) Ks. Kc may be encrypted using a key used to recover classification data in case of disaster; where encrypted data E3=(Kc)Kr. The combination of E1+E2+E3 may persist as a single piece of data EncryptedClassificationData=E1+E2+E3. EncryptedClassificationData may be combined with a unique identifier (GUID) and may be hashed to create a signature Sig=(EncryptedClassificationData+GUID) hmac. This type of encryption scheme can allow for recovery of data when one of the keys has been lost or destroyed.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission; and may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 17:
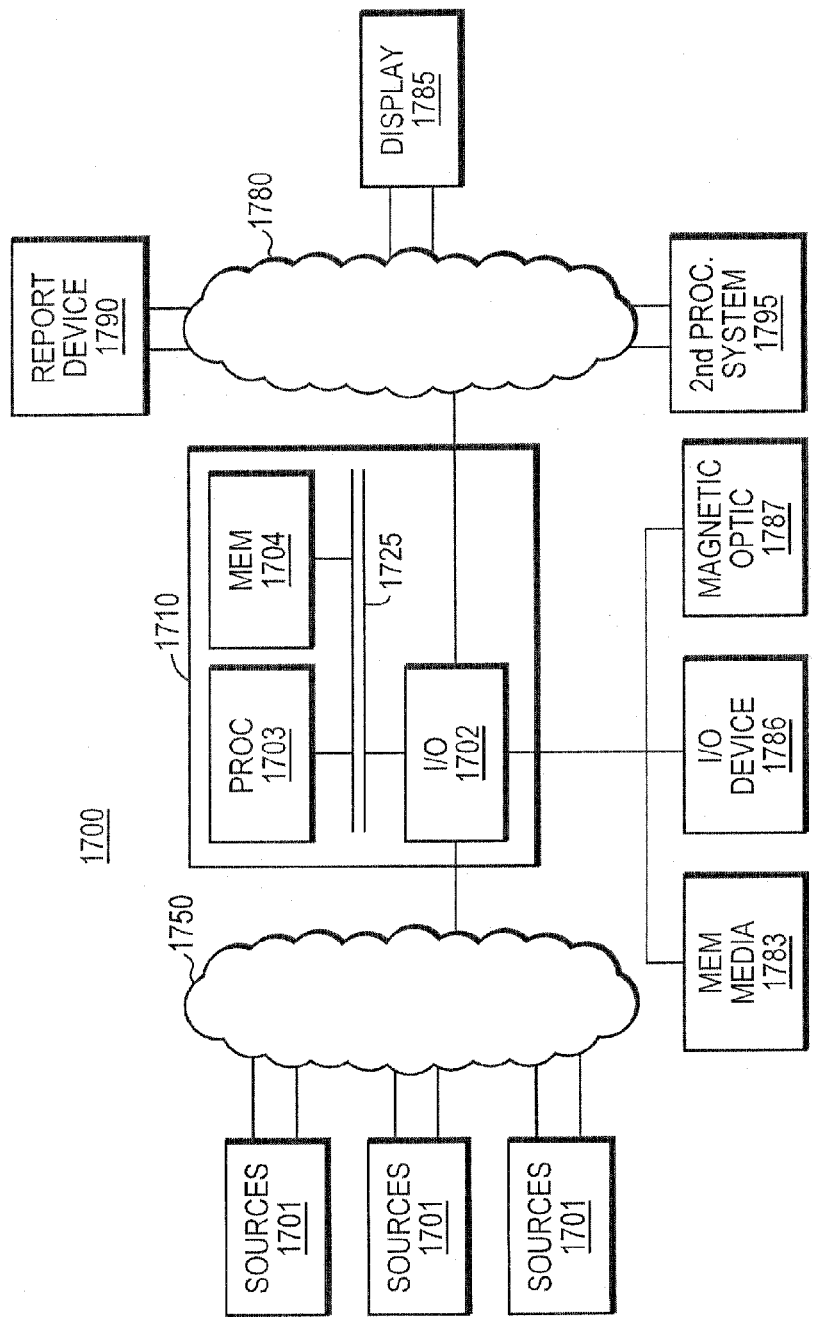

The logic for carrying out the method may be embodied as part of the system described below beginning with reference to FIG. 17, and which is useful for carrying out the methods and apparatus described with reference to embodiments shown in, for example, FIGS. 1-16. In the embodiment of FIG. 17, the computer 1710 contains a processor 1703, memory 1704 and an Input/Output device 1702. As well, in this embodiment, there is a display 1785 coupled to the computer through coupling 1780 and the computer may be linked to a second processing system 1795 also through coupling 1780. The computer 1710 may have multiple storage devices, such as magnetic optical device 1787, Input/Output device 1786, and Memory Media 1783. The computer 1710 may also have a reporting device, 1790 coupled through coupling 1780. As well, the computer may access other sources 1701 through access 1750. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

The invention claimed is:

1. A method for use in identity assurance, comprising:
receiving at a determinator a user credential of a verification of a user identity; wherein the credential includes a stored description of an executed process of the verification method performed by a verifier to verify the user identity;
using the credential by the determinator to determine a granular identity level of trust and a granular verification level of trust, wherein the granular identity level of trust describes an amount of risk associated with what was provided to verify the user identity by associating a granular identity trust level with the description of what was provided to verify the user identity and wherein the granular verification level of trust describes an amount of risk associated with what method was performed to verify the identity and by associating a verification trust level with the verification method performed to verify the identity,
calculating, at the determinator, a granular level of trust based on the granular identity level and the granular verification level;

determining, at the determinator, a trust threshold necessary for a user to perform an operation; and determining, at the determinator, whether to allow the user to perform the operation; wherein if the granular level of trust exceeds the trust threshold the operation is allowed; and storing, in a computer memory, a plurality of user transactions using the user identity associated with the credential; and based on the plurality of user transactions, enabling the determinator to modify the granular level of trust; wherein modification is based on modifying the granular level of trust of the user identification with levels of trust associated with each of the plurality of user transactions.

2. The method of claim 1 further comprising:
encrypting the user credential.

3. The method of claim 2, further comprising:
presenting the description and associated user credential to an authenticator; and
using the description and the associated user credential to allow the authenticator to determine whether to allow the user to perform an operation.

4. The method of claim 1 further comprising:
basing the determination of the granular trust threshold on adaptive criteria.

5. The method of claim 4 wherein the adaptive criteria is based on at least one member of the group comprising time, patterns of behavior, type of authentication requested, and location.

6. The method of claim 1 wherein the trust threshold is based on environmental factors.

7. The method of claim 1 wherein the operation is of a plurality of operations and each operation of the plurality of operations has a different trust threshold.

8. A method for use in identity assurance, comprising:
receiving at a determinator a credential of a verification of a user identity; wherein the credential includes a stored description of an executed process of the verification method performed by a verifier to verify the user identity;

using the credential by the determinator to determine a granular identity level of trust and a granular verification level of trust, wherein the granular identity level of trust describes an amount of risk associated with what was provided to verify the user by associating a granular identity trust level with the description of what was provided to verify the user identity and wherein the granular verification level of trust describes an amount of risk associated with what method was performed to verify the identity and by associating a verification trust level with the verification method performed to verify the identity, calculating, at the determinator, a granular level of trust based on the granular identity level of trust and the granular verification level of trust;

determining, at the determinator, a trust threshold necessary for a user to perform an operation; and determining, at the determinator, whether to allow the user to perform the operation; wherein if the granular level of trust exceeds the trust threshold the operation is allowed; and storing, in a computer memory, a plurality of user transactions using the user identity and the credential; and wherein the determining by the determinator is also based on the plurality of user transactions; wherein the determining is further based on modifying the granular level of trust of the user identification with levels of trust associated with each of the plurality of user transactions.

9. The method of claim 8 further comprising encrypting the user credential.

10. The method of claim 8 wherein the operation is of a plurality of operations and each operation of the plurality of operations has a different trust threshold.

11. A system for use in identity assurance, the system comprising:
a computer having a memory;
computer-executable program code operating in memory, wherein the computer-executable program code is configured for execution of the following steps:
executing a provisioning process used to verify a user identity at a verifier;
storing, by the verifier, a description of said executed process in a computer memory in conjunction with a credential; wherein the description includes information about what verification method was performed and what was provided to identify the user identity; and using the credential by a determinator to determine a granular identity level of trust and a granular verification level of trust, wherein the granular identity level of trust describes an amount of risk associated with what was provided to verify the user by associating a granular identity trust level with the description of what was provided to verify the user identity and wherein the granular verification level of trust describes an amount of risk associated with what method was performed to verify the identity and by associating a verification trust level with the verification method performed to verify the identity, calculating, at the determinator, a granular level of trust based on the granular identity level of trust and the granular verification level of trust;

determining, at the determinator, a trust threshold necessary for a user to perform an operation; and determining, at the determinator, whether to allow the user to perform the operation; wherein if the granular level of trust exceeds the trust threshold the operation is allowed; and storing a plurality of user transactions using the credential;
based on the plurality of user transactions, modifying by the determinator the granular level of trust; wherein modification is based on modifying the granular level of trust of the user identification with levels of trust associated with each of the plurality of user transactions and creating a user credential associated with the granular level of trust.

12. The system of claim 11, further comprising:
encrypting the user credential.

13. The system of claim 11, further comprising:
basing the determination of the granular trust threshold on adaptive criteria.

14. The system of claim 13 wherein the adaptive criteria is based on at least one member of the group comprising time, patterns of behavior, type of authentication requested, and location.

15. The system of claim 11 wherein the operation is of a plurality of operations and each operation of the plurality of operations has a different trust threshold.

16. A system for use in identity assurance, the system comprising:
a computer having a memory;

computer-executable program code operating in memory, wherein the computer-executable program code is configured for execution of the following:

executing a process used by a first party to verify a user identity;

associating, with an output of the executed process by the first party in conjunction with a credential, a description of the executed process stored in a computer memory; wherein the description includes information about what verification method was performed and what was provided to identify the user identity; and using the credential by a determinator to determine a granular identity level of trust and a granular verification level of trust, wherein the granular identity level of trust describes an amount of risk associated with what was provided to verify the user by associating a granular identity trust level with the description of what was provided to verify the user identity and wherein the granular verification level of trust describes an amount of risk associated with what method was performed to verify the identity and by associating a verification trust level with the verification method performed to verify the identity, calculating, at the determinator, a granular level of trust based on the granular identity level of trust and the granular verification level of trust;

determining, at the determinator, a trust threshold necessary for a user to perform an operation; and determining, at the determinator, whether to allow the user to perform the operation; wherein if the granular level of trust exceeds the trust threshold the operation is allowed; and storing a plurality of user transactions associated with the credential; and wherein the determining by the determinator is further based on the plurality of user transactions; wherein the determining is further based on modifying the granular level of trust of the user identification with levels of trust associated with each of the plurality of user transactions.

17. The system of claim 16, wherein the trust threshold is based on an adaptive criteria.

18. The system of claim 17 wherein the adaptive criteria is based on at least one member of the group comprising time, patterns of behavior, type of authentication requested, and location.

19. The system of claim 16 wherein the operation is of a plurality of operations and each operation of the plurality of operations has a different trust threshold.

\* \* \* \* \*